INVENTOR.
Jerome H. Lemelson

United States Patent Office 3,556,918
Patented Jan. 19, 1971

3,556,918
COMPOSITE REINFORCED PLASTIC FOAM SHEET
Jerome H. Lemelson, 85 Rector St.,
Metuchen, N.J. 08840
Continuation-in-part of application Ser. No. 501,394,
Oct. 22, 1965. This application Dec. 3, 1968, Ser.
No. 780,858
Int. Cl. A47l 25/00; B32b 5/18
U.S. Cl. 161—55     6 Claims

ABSTRACT OF THE DISCLOSURE

A composite, sheet-like article of manufacture is provided comprising a base sheet made of flexible, cellular plastic material and a plurality of reinforcing elements secured to one or both major surfaces of the sheet or extending through the sheet. Where the composite sheet is to be utilized as a cleaning and scouring device, the parallelly extending reinforcing elements are surface secured and serve to scour grease while the sponge-like base element serves to retain and dispense a cleaning liquid such as water.

The composite sheet may be formed by welding strip-like or filamental elements to the surfaces of the sheet or by co-extruding said elements with the base material.

RELATED APPLICATIONS

This is a continuation-in-part of application Ser. No. 501,394 filed Oct. 22, 1965, for Combination Sponge and Methods for Producing Same now U.S. Pat. 3,414,928 which is a continuation-in-part of application Ser. No. 257,319 filed Feb. 8, 1963 and entitled Combinational Sponge and Scouring Device, now U.S. Pat. 3,226,751.

SUMMARY OF THE INVENTION

This invention relates to new and improved structures in composite sheet materials and methods for producing same. In one form, the composite structure may be utilized as a sponge and scouring device and is produced by laminating a cellular plastic mass and a plurality of strip-like formations of flexible plastic material. Composite sponges heretofore provided have suffered a number of shortcomings. For example, laminated structures involving a flexible sponge-like body are easily subject to delamination and sponge-like elements containing abrading materials throughout their cellular mass are generally weakened thereby.

Accordingly, it is a primary object of this invention to provide new and improved structures in combination sponges and methods for producing same.

Another object is to provide an improved combination sponge having scouring elements which are welded or heat sealed to the sponge in a manner to prevent the detachment of said elements from the cellular body during normal use.

Another object is to provide an improved method for automatically and continuously fabricating combination sponges by heat sealing techniques which may be applied by automatic means of production equipment.

Another object is to provide an improved, heat-sealed or welded structure in a cellular mass and a rigid element to be attached thereto.

Another object is to provide a method of fabricating a combination sponge by disposing a plurality of scouring elements in a layer of material which is disposed against the cellular surface of a sponge-like body and penetrates the pores thereof, thereby being mechanically secured to the sponge and simultaneously securing the scouring elements thereto.

With the above and such other objects in view as may hereafter more fully appear, the invention consists of the novel constructions, comibnations and arrangements of parts as will be more fully described and illustrated in the accompanying drawings, but it is to be understood that changes, variations and modifications may be resorted to which fall within the scope of the invention as claimed.

Figure 1:
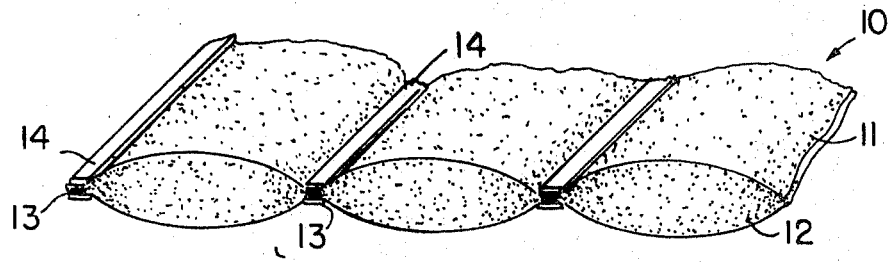
FIG. 1 is an isometric view of a fragment of a reinforced cellular member such as a sponge.

There is shown in FIG. 1 a composite article of manufacture designated 10 made of a sheet or slab-like formation 11 of flexible cellular plastic material such as expanded or foamed polyethylene, polyvinyl chloride, polyurethane, ethylene vinyl acetate or other suitable flexible plastic polymer. The formation 11 is preferably, although not necessarily, originally formed by extrusion of the polymer in the shape of a sheet or slab-like configuration which is expanded as it is extruded onto a conveyor belt or other suitable means. A plurality of parallelly extending reinforcing elements 15 are shown welded or otherwise bonded along their length to either or both surfaces of the cellular member 11. During the welding or bonding procedure, the flexible cellular plastic material becomes permanently compressed by the action of the heat and pressure applied by opposed welding wheels so as to shape the cellular material 11 into a plurality of parallel formations 12 which will be defined as corrugations which are joined by portions 13 of reduced thickness which may or may not be cellular in nature. In other words, the compressed portions 13 may have their cell-like structure completely compressed together so as to fuse all of the cells into a plurality of non-cellular formations or to partially eliminate or reduce the cellular volumes in alignment with the necked-down portions 13.

The parallelly extending members 14 may comprise elongated strips of plastic material, preferably having a tensile strength substantially greater than the strength of the foamed plastic member 11. Said strip-like members 15 may be cut from plastic sheet made of rigid or semi-rigid formulations of plastics which are compatible with the resin of the cellular plastic material to which they are welded such as polyvinyl chloride, polyethylene, polypropylene, polyurethane, polyester, polyamide or other suitable plastic. By cutting said strip-like formations from a sheet, edging is provided at the borders of the strips which may be utilized for scouring purposes if the composite material 10 is to be used as a composite sponge. Since the strips 14 are greater in tensile strength than the cellular plastic material comprising the sheet 11, they also serve to substantially reinforce and prevent the cellular plastic material from deteriorating or coming apart during use. Accordingly, the structure illustrated in FIG. 1 may be utilized to substantially reinforce a cellular plastic sheet for applying same to applications other than that of cleaning and scouring such as its use as a liner in clothing, insulation, shock absorbing material, etc. The elements 14 may also be extrusion formed continuously with the cellular material comprising the base sheet 11 or extrusion formed separately therefrom and continuously compressed against the base sheet 11 by suitable cooperating wheels or rolls extending across the entire composite sheet and operative to compressively weld or roll bond the strips to the cellular sheet. The formations 14 may also have other configurations such as those of filaments and, accordingly, the term strip-like elements as applied herein refers to any suitable elongated flat, cylindrical or otherwise shaped elements which are applied directly to and fusion bonded or welded against either or both surfaces of the cellular base sheet.

Figure 2:
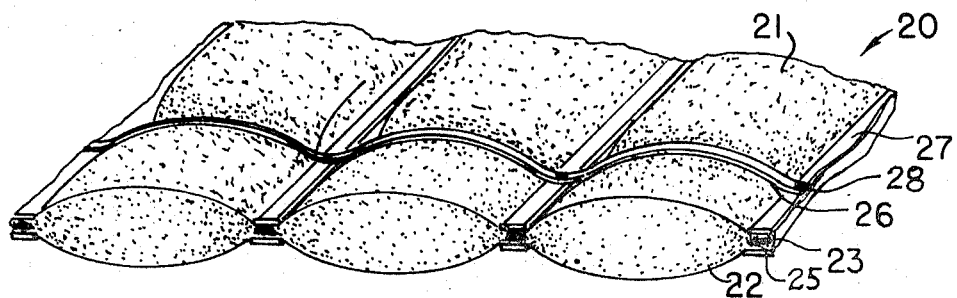
FIG. 2 is an isometric view of a fragment of a modified form of reinforced sponge member having scouring strip elements welded thereto which serve also to strengthen the cellular member across its entire surface area.

FIG. 2 illustrates a modified form of the structure shown in FIG. 1 having parallel, criss-crossing arrays of welding lines dividing a sheet of flexible cellular plastic material into a quilt-like configuration. The composite material 20 comprises a cellular plastic sheet-like member 21 having a plurality of pillow-like formations 22 formed of said sheet 21 by respective parallel arrays of welding lines denoted 25 and 25' which criss-cross each other either obliquely or at right angles to each other. The action of at least one set of welding dies having parallel criss-crossing arrays of welding blades compressing the cellular sheet 21 together during the welding operation is such as to devide the formations 22 from each other by compressed portions 23 of the cellular sheet of substantially reduced thickness characterized by non-cellular material or material having reduced cellular structure as described for the structure shown in FIG. 1.

In FIG. 2 a plurality of strips 27 of reinforcing plastic extend parallel to each other and are welded to compressed portions 23 of the cellular sheet 21 and are welded thereto along their length. Extending at right angles or obliquely to the strips 27 are a plurality of strips 26 of plastic which may be similar in shape to the strips 27 and may serve to reinforce as well as perform scouring action if the composite article is to be used for scouring and wiping purposes such as combination sponge. The strips 26 may be welded to the strips 27 where they cross, notation 28 being used to define a spot weld between the crossing strips 26 and 27. Strips 26 may also be bonded or welded along their lengths to the surface of the cellular member along compressed portions thereof similar to portions 23, or the strips 26 and 27 may comprise parallel elements of a plastic mesh or net which cross each other and are welded or formed together and welded to the sponge base sheet 21 along parallel lines, criss-crossing weld line or spot welded portions of the base sheet.

Figure 3:
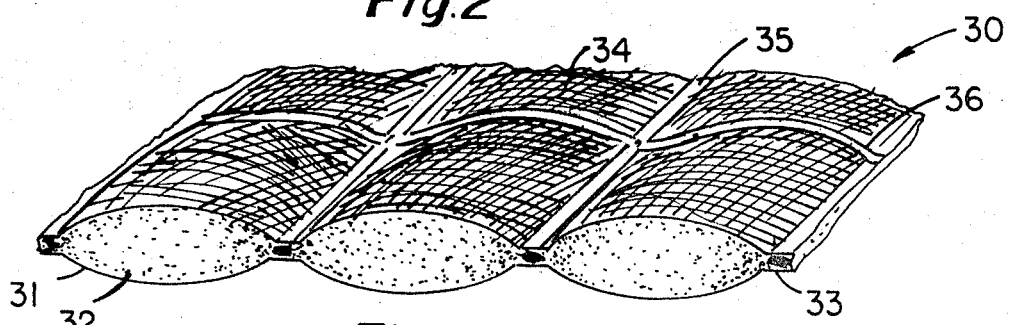
FIG. 3 is an isometric view of a cellular sponge member having welded to one of the major surfaces thereof a net or random array of filaments to reinforce same and serve as scouring means.

In FIG. 3, a composite article 30 is provided which is made of a base sheet 31 of cellular plastic material of the type described having corrugated or pillow-like formations 32 thereof separated by necked down portions 33 as described. Covering a surface of the sheet 31 are a plurality of filaments or strip-like elements designated 34 extending either randomly or orderly such as a non-woven material or plastic netting and welded to base 31 by a plurality of criss-crossing weld lines denoted 35 and 36 which are preferably so spaced apart that each of the filaments of the random array described will be bonded or fusion welded to the base sheet along one or more portions thereof along its length so as to bond all the filaments to the base sheet. In another configuration, the filaments 34 may be fusion welded to each other prior to or after depositing same upon either or both surfaces of the base sheet 31 so that the weld lines 35 and 36 need not be spaced too closely together.

Figure 4:
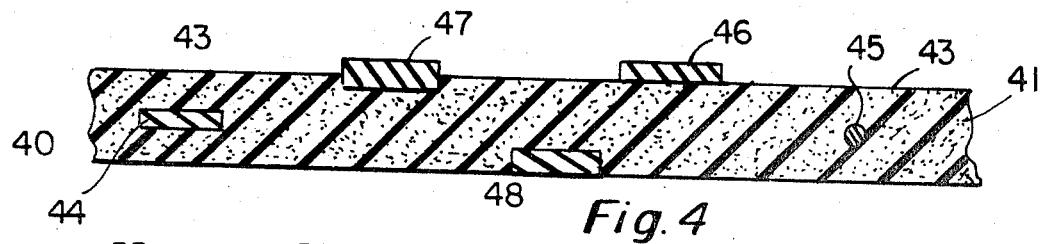
FIG. 4 is an end view of a cellular member having various different reinforcing strips and filaments secured thereto for reinforcing same.

In FIG. 4 is shown another configuration in the composite sheet material 40 comprising a base sheet 41 which is extrusion formed of a polymer which is expanded as it is formed to provide a cellular or foamed plastic formation. Co-extruded with the material comprising the cellular plastic member 41 are a plurality of reinforcing elements, a number of which are shown differently disposed within or withon the cellular plastic sheet 41.

Partially encapsulated within the sheet 41 and having its outer surface parallel to one surface 42 of the sheet 41, is a strip-like formation 48 of non-cellular plastic material which may serve to reinforce the sheet 41. Said non-cellular material 48 may be co-extruded with the sheet 41.

Secured to the other surface 43 of member 41 is a strip-like formation 47 of non-cellular material, half of which formation extends into the sheet 41 while the upper portion thereof protrudes beyond the other surface 43 of sheet 41. A strip-like elongated element 46 is shown bonded to the outer flat surface 43 of the sheet-like member 41.

Also shown extending longitudinally through the sheet 41 is a filament 45 of reinforcing material as described.

It is to be noted that any one of the structural or reinforcing elements 44–48 of FIG. 4 may be provided per se as a plurality of parallel formations thereof or two or more of the illustrated element locations and structures may cooperate to both surface and internally reinforce a sheet of flexible, cellular plastic material which would otherwise be relatively weak and possessing little tensile strength.

It is noted that various composite sheet-like or otherwise shaped material may employ certain of the teachings found in FIG. 4 to provide new and improved materials formed by the co-extrusion of flexible and more rigid plastics. For example, the base sheet 14 of FIG. 4 may comprise any suitable flexible polymer which is not foamed or expanded into a cellular mass. The formation 41 may comprise a sheet of flexible polyvinyl chloride, polyethylene, ethylene vinyl acetate, polybutadiene-styrene, polyurethane or other flexible plastic which is desired to be reinforced by co-extending a plurality of parallel strip-like or filamental formations such as 46 on either or both surfaces thereof. The formations 46 may be co-extruded with the flexible plastic material 41 from the same die or from separate dies and guided into engagement with either or both surfaces 42 and 43 of the sheet whereafter said strip-like extrusions are compressively engaged thereagainst in a manner to weld or bond them to the surfaces of the sheet to provide a strip or filament reinforced flexible sheet material having the illustrated or different relative dimensions for the components thereof. The strip-like formations 46 may comprise more rigid formulations of polyethylene, polyvinyl chloride, polypropylene, polyester, polyamide or other suitable resins.

Formations partially or totally embedded such as those denoted 44, 45, 47 and 48 may also be co-extruded or combined with the sheet 41 and welded or bonded thereto while either or both the components are in a molten or semi-molten condition.

Figure 5:
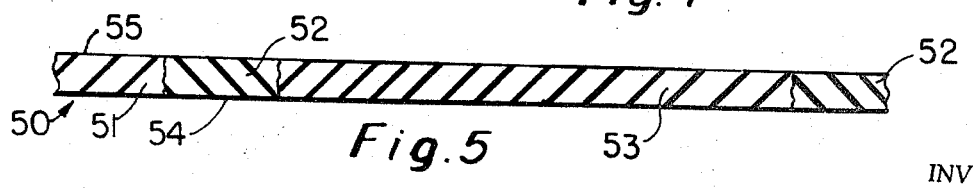
FIG. 5 is an end view in cross section of a composite sheet, portions of which are made of flexible plastic and portions of which are made of more flexible plastic.

In FIG. 5 is shown another construction in a reinforced composite sheet material formed by the co-extrusion of at least two different materials. The composite material 50 is in the form of a sheet 51 shown as being of substantially constant thickness, said sheet being formed by the co-extrusion of a first flexible polymer forming the major part of the sheet and defined by parallelly extending relatively wide sheet or band-like portions 53 which are separated by relatively narrower portions 52 of the sheet, the narrower portions being extruded of a polymer having a substantially greater tensile strength than the polymer forming the portions 53. The narrow strip-like portions 52 thus serve to substantially enhance the tensile strength of the sheet and, depending on the stiffness of said strip-like portions 52, may also provide support for the flexible material portions 53 to define a sheet of plastic having both rigid and flexible characteristics. The plastic sheet 51 may vary in thickness from film thickness in the order of .001" or less to thicknesses of as much as 1/32" to 1/16" or more. The flexible and rigid portions 53 and 52 of the sheet may comprise different formulations of the same or different polymers. For example, the sheet 51 may be made of high and medium or low density polyethylene, flexible and rigid formulations of polyvinyl chloride, combinations of copolymers and monopolymers such as ethylene vinyl acetate, a flexible material, and rigid vinyl, medium or high-density polyethylene, polypropylene, etc. which are co-extruded together.

It is also noted that the sheet 51 may vary in thickness along its length with the rigid strip-like portions 52 protruding outwardly from either or both the surfaces 54 and 55 of the flexible portions 53 of the sheet or, in certain instances, being of less thickness than said flexible portions but integrally joined to the edges of said flexible portions by being co-extruded therewith. It is also noted that the structures hereinabove described for the sheet 51 of FIG. 5 may also apply to sheet formed of cellular and non-cellular materials, the cellular portions defined by either cross-sectional portions 52 or 53 and the non-cellular portions by others. The strip-like portions 52 may be formed as a plurality of separately extruded streams extending parallel to the longitudinal axis of the sheet or in a net-like array of crossing strip-like formations extending completely across and along the length of the sheet 51.

In a method for forming composite sheet-like members of the type shown in FIGS. 1-4, it is noted that a first sheet of flexible cellular material may be extrusion formed or continuously fed from a coil-like supply thereof while the strip-like elements 15, 46, 47, etc. may be continuously extruded as a sheet or fed from a coil of sheet material which is slit into the strip-like elements, the elements being thereafter guided in parallel or other array to contact with either or both the major surfaces of the cellular sheet and roll-bonded or welded thereto on a continuous basis to form the structures illustrated. Ultrasonic welding means may also be provided to engage and compress the strip-like elements against the cellular body as they are fed and to weld said elements to the cellular body to form structures of the types described above.

If the foam and strip materials are made of electronically weldable polymers such as polyvinyl chloride radio-frequency energized electrodes of the stationary bar type or rotary wheel type may be applied to welding the strips to the base sheet by aligning and passing the composite materials through the proper-welding apparatus.

In another fabrication method, either or both surfaces of the core or foamed plastic sheet may be rendered molten by the application of suitable heat thereto by radiation or conduction through rollers or a platen and the strips, filaments or netting described may be welding in situ onto the molten surface or surfaces by compression thereagainst in the same or different platen or roller arrangement used to heat the foam.

In still another method of producing structures as described, the strips, filaments or netting described may be applied to a slab, sheet or other formation of cellular plastic material held in a form or on a conveyor belt while it is in the state of being expanded into a cellular mass and is still molten and adhesive or capable of receiving and encapsulating portions of the applied filaments or netting therein and retaining same in assembly therewith.

In a specific method of forming a foamed plastic member or a composite material having a foamed or otherwise composed plastic material which is reinforced as described herein, filaments or strips in a random or orderly array or a netting or screen of plastic, metal or other material may be disposed against the walls of a mold such as an injection mold, a casting mold, a slush mold or a rotational mold and held in place by fastening or other means while a suitable polymer is either conventionally cast, rotationally cast, injection molded per se or foamed in situ to fill the mold or form into a hollow shell against the mold walls in a manner to become attached to or encapsulate said netting or screen therein which becomes part of the resulting molding and serves to reinforce same upon removal from the mold. Detachable or rupturable fastening means may be provided to initially hold said netting to the wall of the mold or spaced therefrom so that the molding may be removed from the mold without difficulty. Such detachable means may comprise pins or wires which are frictionally held by wires attached to the mold wall or in holes or subcavities in the mold wall.

What is claimed is:

1. A composite article of manufacture comprising:
   a flexible cellular sheet of plastic foam having opposed major faces,
   a plurality of elongated plastic strips secured to the opposite faces of said cellular sheet,
   the strips on one face of said sheet being bonded to said sheet and in alignment with respective strips on the other face of said sheet,
   respective partions of said sheet being compressed together in the areas where said strips are aligned with each other so as to define and separate the sheet into separate corrugations reinforced at the borders of said corrugations by said strips,
   portions of said strips extending outwardly from the surface of said sheet and being shaped so that they may serve as scouring elements for dirt on surfaces wiped by said sheet.

2. A composite article in accordance with claim 1, whereby said strips are spot welded at a plurality of locations along their length to said sheet.

3. A composite article in accordance with claim 1, whereby the strips on both surfaces of said sheet extend parallel to each other.

4. A composite article in accordance with claim 1, whereby said strips are elements of a plastic netting held to said sheet by having certain of the elements of said netting bonded to said sheet.

5. A composite article of manufacture in accordance with claim 1, whereby said strips are welded along their length to said sheet.

6. A composite article in accordance with claim 5, whereby the strips on each surface of said sheet crisscross each other and are welded together where they cross.

References Cited

UNITED STATES PATENTS

| | | | |
|---|---|---|---|
| 2,804,728 | 9/1957 | Politzer et al. | 15—118X |
| 2,885,703 | 5/1959 | Elliott | 15—118 |
| 3,172,072 | 3/1965 | Willy | 161—159X |
| 2,593,553 | 4/1952 | Francis | 161—89X |
| 3,038,187 | 6/1962 | Nathanson | 161—160X |
| 3,058,863 | 10/1962 | Gaines et al. | 161—95 |
| 3,298,884 | 1/1967 | Willy | 156—79 |
| 3,410,748 | 11/1968 | Blue | 161—159 |

FOREIGN PATENTS

| | | | |
|---|---|---|---|
| 260,318 | 5/1963 | Australia | 15—118 |
| 581,239 | 8/1959 | Canada | 161—58 |

ROBERT F. BURNETT, Primary Examiner

W. A. POWELL, Assistant Examiner

U.S. Cl. X.R.

15—118; 156—219, 290, 306; 161—60, 121, 123, 148, 159